United States Patent
Eick et al.

(10) Patent No.: US 10,241,225 B2
(45) Date of Patent: Mar. 26, 2019

(54) PLASTIC FRACK TRACER

(71) Applicant: CONOCOPHILLIPS COMPANY, Houston, TX (US)

(72) Inventors: Peter M. Eick, Houston, TX (US); Joel D. Brewer, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 139 days.

(21) Appl. No.: 15/151,278

(22) Filed: May 10, 2016

(65) Prior Publication Data

US 2016/0333689 A1    Nov. 17, 2016

Related U.S. Application Data

(60) Provisional application No. 62/160,096, filed on May 12, 2015.

(51) Int. Cl.
| | | |
|---|---|---|
| E21B 43/267 | (2006.01) | |
| G01V 3/24 | (2006.01) | |
| C09K 8/80 | (2006.01) | |
| G01V 3/26 | (2006.01) | |
| G01V 3/38 | (2006.01) | |

(52) U.S. Cl.
CPC ............... *G01V 3/24* (2013.01); *C09K 8/80* (2013.01); *E21B 43/267* (2013.01); *G01V 3/26* (2013.01); *G01V 3/38* (2013.01); *C09K 2208/08* (2013.01)

(58) Field of Classification Search
CPC .......... E21B 43/267; G01V 3/24; G01V 3/38; G01V 3/26; C09K 8/80; C09K 2208/08
See application file for complete search history.

(56) References Cited

U.S. PATENT DOCUMENTS

| | | | |
|---|---|---|---|
| 3,933,205 A | 1/1976 | Kiel | |
| 8,230,918 B2 | 7/2012 | Ameen | |
| 8,269,501 B2 | 9/2012 | Schmidt et al. | |
| 8,869,888 B2 | 10/2014 | Cramer et al. | |
| 2008/0053657 A1* | 3/2008 | Alary | C04B 35/111 166/280.2 |
| 2009/0288820 A1* | 11/2009 | Barron | B01J 13/02 166/249 |
| 2010/0147512 A1* | 6/2010 | Cramer | G01V 3/26 166/250.1 |
| 2012/0129737 A1 | 5/2012 | Lesko et al. | |

(Continued)

FOREIGN PATENT DOCUMENTS

WO    2015021083    2/2015

OTHER PUBLICATIONS

Eick, P.M., Correlation of Ash-Flow Tuffs by Multifrequency Susceptiblity Measurements., Masters Thesis, University of Utah, Dec. 1989.

(Continued)

*Primary Examiner* — Brad Harcourt
(74) *Attorney, Agent, or Firm* — Boulware & Valoir

(57) ABSTRACT

Novel proppants, proppant mixes and proppant slurries comprising a diamagnetic polymeric proppant that exhibits induced paramagnetism in an AC field is used to prop hydraulic fractures, and the paramagnetism used to assess fracture width, depth, connectivity, branching and the like. Fracturing methods are also provided, together with fracture assessment and imaging methods.

9 Claims, 3 Drawing Sheets

(56) References Cited

U.S. PATENT DOCUMENTS

2012/0325474 A1* 12/2012 Bicerano ............... B82Y 30/00
166/280.2
2013/0236064 A1    9/2013 Li et al.
2015/0107830 A1    4/2015 Ersoz et al.

OTHER PUBLICATIONS

Pol, VG, Upcycling: converting waste plastics into paramagnetic, conducting, solid, pure carbon microspheres, Environ Sci Technol. Jun. 15, 2010;44(12):4753-9.
Zaidia, N. A., Room temperature magnetic order in an organic magnet derived from polyaniline, Polymer 45 (2004) 5683-5689.
International Search Report for related case, App. No. PCT/US2016/031658, dated Aug. 11, 2016.

* cited by examiner

PLASTIC FRACK TRACER

PRIOR RELATED APPLICATIONS

This application is a non-provisional application which claims benefit under 35 USC § 119(e) to U.S. Provisional Application Ser. No. 62/160,096 filed May 12, 2015, entitled "PLASTIC FRACK TRACER," which is incorporated herein in its entirety.

FIELD OF THE DISCLOSURE

The disclosure generally relates to method of measuring shale oil permeability using tracers that can be imaged to confirm that core plugs are intact.

BACKGROUND OF THE DISCLOSURE

Hydraulic fracturing or "fracking" is the propagation of fractures in a rock layer by a pressurized fluid. The oil and gas industry uses hydraulic fracturing to enhance subsurface fracture systems to allow oil or natural gas to drain more freely from the reservoir to production wells that bring the oil or gas to the surface. However, there many uses for hydraulic fracturing outside of the petroleum industry, including to stimulate groundwater wells, to precondition rock for cave in mining, to enhance waste remediation processes, to dispose of waste by injection into deep rock formations, including $CO_2$ sequestration, to measure the stress in the earth, and for heat extraction in geothermal systems.

In hydraulic fracking, an injection fluid, usually including water or brine and a polymer and/or sand, is injected into a reservoir at pressures high enough to fracture the rock. The two main purposes of fracturing fluid or "frack fluid" in oil reservoirs is to extend fractures in the reservoir and to carry proppants, such as grains of sand, into the formation, the purpose of which is to hold the fractures open without damaging the formation or production from the well. The purpose of the polymer is to thicken the frack fluid, allowing it to more effectively carry the proppant deeper into the reservoir.

Without fracking, the time needed to drain a field would be inordinately long—in a tight field it could be in the order of hundreds of years. The only way to drain the oil in a reasonable time is to drill more wells—e.g., up to 40 wells per square mile in a tight field—a very expensive undertaking, or to fracture the field. The existence of long fractures allows the fields to be drained in a reasonable time period, with fewer wells, and in a more cost effective way.

Since Stanolind Oil introduced hydraulic fracturing in 1949, close to 2.5 million fracture treatments have been performed worldwide. Some believe that approximately 60% of all wells drilled today are fractured. Fracture stimulation not only increases the production rate, but it is credited with adding to reserves-9 billion bbl of oil and more than 700 Tscf of gas added since 1949 to US reserves alone—which otherwise would have been uneconomical to develop. In addition, through accelerating production, net present value of reserves has increased.

In 1976, Othar Kiel started using high-rate "hesitation" fracturing to cause what he called "dendritic" fractures—with tree like branching patterns. The method was invented from the observation of unusually good production increases from a number of wells that had been temporarily shut in due to equipment failures. Since the two groups of wells differed primarily in a single factor—an inadvertent shut-down period—another group of wells was selected for controlled tests of this factor, and it was found that when an intentional shut-down period of one hour was put in the frack plan, the first month's production was about double!

The U.S. Pat. No. 3,933,205 Kiel patent describes the method, now known as the "Keil process" or "dendritic fracturing." The process uses a cyclic injections to form extraordinarily long, branching flow channels. Fracking pressures induces spalling (flaking of rock fragments) from the fracture faces. When the well is shut in and then reinjected, the fluid movement moves the debris to the ends of the fractures, causing increased pressures at the end, and thus further propagating the fracture in a direction perpendicular to the initial fracture. Repeated cycles cause further branching. The transverse fractures will eventually intersect and communicate with natural fractures that parallel the direction of the primary fracture, thus a fully branched drainage system is developed. Further improvement can be had if the wells are opened for reverse flow during the shut-down period.

The Kiel method has been applied with good results to a wide range of formations at depths to 11,500 ft. Most of more than 400 dendritic (branching) fracturing jobs performed since the 70's have shown sustained productivity increases of 2-5 times those generated by conventional fracturing.

Heterogeneous proppant placement (HPP) is yet another new approach in hydraulic fracturing, invented Schlumberger Technology Corporation (U.S. Pat. No. 6,776,235). Well productivity is increased by sequentially injecting into the wellbore alternate stages of fracturing fluids having a contrast in their ability to transport propping agents to improve proppant placement, or having a contrast in the amount of transported propping agents. The propped fractures obtained following this process have a pattern characterized by a series of bundles of proppant spread along the fracture. In another words, the bundles form "pillars" that keep the fracture opens along its length and provide channels for the formation fluids to circulate.

Although fracking is quite successful, even incremental improvements in technology can mean the difference between cost effective production, and reserves that are uneconomical to produce. One area of improvement would be the possibility of assessing or even imaging the fractures in the reservoir, so that the fractures can be evaluated and the frack plan modified as needed for optimization.

Current imaging technology tends to be either expensive and time consuming to obtain or of limited value. Imaging methods include seismic imaging, microseismic imaging, both of which are expensive. Core samples can be obtained and the fractures imaged therein, but the information is limited to the core samples, plus the coring process itself tends to introduce artificial fractures. Borehole images in contrast are cheaper to acquire than core samples and can hence be acquired over longer intervals in more wells. They image the fractures in situ, showing whether they are open or closed in the subsurface. They are oriented, enabling the predominant fracture orientation(s) to be determined. However, core and borehole image analysis in 1D cannot directly measure fracture length or connectivity—key controls on fracture permeability. 2D outcrop analogue mapping can measure fracture length or connectivity, yet the outcrop data may inaccurately predict in situ results.

What is needed in the art are better methods of ascertaining the fracture patterns of reservoirs.

SUMMARY OF THE DISCLOSURE

Materials respond differently to the force of a magnetic field. The orientation of the spin of the electrons in an atom, the orientation of the atoms in a molecule or alloy, and the ability of domains of atoms or molecules to line up are the factors that determine how a material responds to a magnetic field. There are three main classifications of magnetic materials. A magnet will strongly attract ferromagnetic materials, weakly attract paramagnetic materials and weakly repel diamagnetic materials.

Ferromagnetic materials are strongly attracted by a magnetic force. The elements iron (Fe), nickel (Ni), cobalt (Co) and gadolinium (Gd) are such materials. The reasons these metals are strongly attracted are because their individual atoms have a slightly higher degree of magnetism due to their configuration of electrons, their atoms readily line up in the same magnetic direction and the magnetic domains or groups of atoms line up more readily.

Paramagnetic materials are metals that are weakly attracted to magnets. Aluminum and copper are such metals. These materials can become very weak magnets, but their attractive force can only be measured with sensitive instruments. Temperature can affect the magnetic properties of a material. Paramagnetic materials like aluminum, uranium and platinum become more magnetic when they are very cold. The force of a ferromagnetic magnet is about a million times that of a magnet made with a paramagnetic material. Since the attractive force is so small, paramagnetic materials are typically considered nonmagnetic.

Certain materials are diamagnetic, which means that when they are exposed to a strong magnetic field, they induce a weak magnetic field in the opposite direction. In other words, they weakly repel a strong magnet. Some have been used in simple levitation demonstrations. Bismuth and carbon graphite are the strongest diamagnetic materials. They are about eight times stronger than mercury and silver. Other weaker diamagnetic materials include water, diamonds, wood and living tissue. Note that the last three items are carbon-based.

Most plastics are considered diamagnetic and they are diamagnetic under DC current. However, certain plastics become paramagnetic under an AC magnetic field. This property was found by accident while developing a multi-frequency susceptibility instrument and the property is not well known, nor have applications been developed to capitalize on it.

Two types (at least) of EM apparatus are available that permit the measurement of apparent magnetic susceptibility: "Slingram" type apparatus (e.g., SCM, EM15, SH3, CS60 and CS 150) composed of two separate magnetic dipoles (a transmitter and a receiver), and apparatus with one (coincident loop) or two loops, such as the apparatus manufactured by Bartington (Ltd) used preferentially by British teams for topsoil susceptibility surveys.

Examples, of commercially available multi-frequency susceptibility instruments are the PROMIS, a slingram instrument by IRIS, Terraplus's GEM-2, Terraplus's KT-20 (dual range) unit, Bartington's MS2/MS3 and borehole suite of tools. One can also build a custom system or modify a commercial system to multi-frequency capability such as the Sapphire Systems SI-2 system.

A multi-frequency susceptibility instrument is a frequency varying AC field generator. By inducing a sample into the field generator, the back EMF and quadrature of the AC signal can be measured and then converted to a susceptibility measurement that is a function of the frequency. Super-paramagnetic and diamagnetic materials have been shown to "block in" and become paramagnetic at different frequencies which can then be related to grain size chemistry and shape. Many plastics show paramagenetic behavior at different frequencies as a function of their chemistry and production history. This property was observed during testing of rock samples that showed a strongly positive susceptibility increase after certain frequencies. The effect was found during standards testing of the multi-frequency susceptibility instrument and then traced back to the plastics used for the construction of the coil.

The disclosure generally relates to the inclusion of plastic proppant materials in the frack pack that can subsequently be exposed to an AC magnetic field, inducing paramagnetism that can then be assessed and/or imaged with any means available in the art.

Means for applying an AC magnetic field to the polymeric proppants can be any known in the art, including e.g., microresistivity imaging device, induction log, surface induced polarization "IP" type profiling or borehole "IP" profiling or any similar method. With the appropriately chosen polymeric proppant, the required inducing field can be tuned to maximize the measured change or alternatively, given a certain produced field strength, a polymeric proppant could be picked that would respond to that produced field.

Preferred frequency ranges for the AC magnetic field are those that induce paramagnetism, such as 500-20,000 Hz, 1000-10,000 Hz, or 2,000-5,000 Hz. Preferred magnetic field strength is >1 Tesla, >2 tesla, >10 Tesla. It may also be possible to use <<1 tesla, depending on various factors. Of course, the parameters needed to detect the paramagnetic change are depending on the polymer chosen, its manufacturing history, as well as distances, equipment sensitivity and the presence of confounding signals. Thus, the frequency and strength chosen would depend on such variables. This can easily be measured at the surface as part of the setup of the tool with a multi-frequency susceptibility tool.

Detection means include e.g., Magnetic Resonance Imaging (MRI), nuclear magnetic resonance (NMR) logs, down hole magnetometers, microresistivity imaging devices, Electron Paramagnetic Resonance (EPR) or more simply just measuring the back emf and quadrature of the inducing AC field of the excitation coils similar to how a multi-frequency susceptibility instrument works.

One suitable magnetic logging sonde developed for sedimentary rocks is Schlumberger's Geological High-Resolution Magnetic Tool (GHMT™). It actually comprises two tools: one to measure the total magnetic field and one to measure magnetic susceptibility. The tool housings are non-magnetic and electrically insulating with a diameter of 4 in. [100 mm]. This tool would need a driving AC coil added to it for the excitation current and the appropriate software added to attenuate the strong magnetic field created by the driving AC coil. Neither problem is a significant engineering issue and thus the modifications can easily be made.

U.S. Pat. No. 8,269,501, for another example, discloses methods for imaging geological structures include injecting magnetic materials into the geological structures, placing at least one magnetic probe in a proximity to the geological structures, generating a magnetic field in the geological structures and detecting a magnetic signal. The at least one magnetic probe may be on the surface of the geological structures or reside within the geological structures. The methods also include injecting magnetic materials into the geological structures, placing at least one magnetic detector in the geological structures and measuring a resonant frequency in the at least one magnetic detector. Methods for using magnetic materials in dipole-dipole, dipole-loop, and loop-loop transmitter-receiver configurations for geological structure electromagnetic imaging techniques are also disclosed. The difference between our invention and this concept is that our materials are not magnetic until we want them to be via the AC inducing coil at the appropriate frequency. Thus, we can use the concepts eluded to in this patent, but with the added ability to turn on and off the magnetic properties of our polymeric material.

The point at which the plastic becomes paramagnetic is called the "blocking in frequency." The term comes from the hypothesized way that a magnetic domain works. Below the "blocking in frequency" the magnetic crystal is able to oscillate in phase with the inducing AC frequency. In this state the magnetic crystal can be diamagnetic or paramagnetic. With increasing frequency depending on the crystal size and shape, at some frequency the magnetic crystal can no longer track in phase the inducing AC field and then will normally orient to the direction of maximum lines of flux of the inducing field and become paramagnetic.

Some materials never "block in" and have no response to the inducing fields. A good example is water where at microwave frequencies it can still oscillate and cause friction warming up our food. Normally, most plastics will become more magnetic with higher frequency as one blocks in more of the atoms in the structure to make them act magnetically. To determine the blocking in frequency, one can use a multi-frequency susceptibility instrument and increase the frequency until the material goes from diamagnetic to paramagnetic. If the material is functionally suitable as a proppant it would be used in the well otherwise it would be rejected and another material tested.

If the appropriate solid plastic proppant material is used in reservoir fracturing, one could essentially turn on a weak magnet in the formation where the proppant had invaded. This could be detected in a 4D sense, or via localized wellbore based magnetic mapping. In the well based case, by varying the power and frequency of the AC field, one could form a 3D map of the frac as it grew out from the well. In the surface case, using continuous recorders on the surface, the magnetic field could be varied in terms of the 4D signal and the intensity so the fractures could be mapped.

Suitable materials for use as polymeric proppants are those that are stable under reservoir conditions (e.g., will not dissolve or melt). Those materials that are less stable may, however, be coated with a more stable material to ensure a sufficient half-life.

Preferably, the induced paramagnetic proppants are spherical, but rods and other shapes are possible (see FIG. 2) and may be preferable because their blocking in frequency is controlled by the size and shape of the crystals formed during manufacture. Furthermore, the proppant is sized so as to remain in the fracture and provide resistance to washout.

In some embodiments, the proppants are sized to be as big as or slightly bigger than any non-polymeric proppants during a particular stage. Slightly larger polymeric proppants will be squeezed by the formation when injection pressure is reduced, thus trapping the proppant therein.

In other embodiments, the proppants are very small, but are made of or coated with a material that adheres to reservoir rock.

In yet other embodiments, the induced paramagnetic proppants are shaped to tangle with the other proppants for retention, e.g., are fibrous (5×-10× or more longer than their width).

Such materials include PANiCNQ, which is a combination of emeraldine-based polyaniline (PANi) and tetracyanoquinodimethane (TCNQ) (see FIG. 3). Another light sensitive plastic magnet is made from a polymer comprised of tetracyanoethylene (TCNE) combined with manganese (MN) ions—atoms of the metal manganese with electrons removed.

Polyethylene, is a commonly known and preferred material with sufficiently thermal stability to act as a proppant, yet commonly displays paramagnetic response. Thus, high density PE (HDPE) may also be suitable for use as a proppant.

Ultra-high-molecular-weight polyethylene (UHMWPE, UHMW) is a subset of the thermoplastic polyethylene. Also known as high-modulus polyethylene, (HMPE), or high-performance polyethylene (HPPE), it has extremely long chains, all oriented in the same direction, with a molecular mass usually between 2 and 6 million u. The longer chain serves to transfer load more effectively to the polymer backbone by strengthening intermolecular interactions. This results in a very tough material, with the highest impact strength of any thermoplastic presently made. Further, the aligned chains offer the best paramagnetism. Indeed, many plastics can be made so as to optimize both hardness and paramagnetic properties.

Another promising material are the paramagnetic carbon microspheres converted from waste plastics. See Pol (2110). This author describes converting various waste plastics [low density polyethylene (LDPE), high density polyethylene (HDPE), polyethylene terephthalate (PET), polystyrene (PS), or their mixtures] into carbon microspheres (CMSs). The thermal dissociation of these individual or mixed WP in a closed reactor under autogenic pressure (approximately 1000 psi) produced dry, pure powder of CMSs. Room-temperature paramagnetism was reported in CMSs prepared from waste LDPE, HDPE, and PS.

The invention thus includes any one or more of the following embodiments, in any combination thereof:

A method of assessing hydraulic fracturing in a reservoir, said method comprising:
(a) injecting a fracturing fluid into a reservoir at a pressure sufficient to fracture said reservoir producing fractures;
(b) injecting a proppant into said fractures, said proppant comprising a polymeric material that is normally diamagnetic but becomes paramagnetic when exposed to an alternating current (AC) field;
(c) applying an AC magnetic field to said fractures to induce paramagnetism in said proppants; and
(d) detecting said paramagnetism to assess said fractures.

A proppant comprising a particle comprising a diamagnetic material that exhibits induced paramagnetism when exposed to an AC field at or above a particular frequency.

A proppant slurry comprising a fracturing fluid plus one of the proppants herein described.

A proppant or slurry mixed with a sand proppant, a ceramic proppant or a high strength proppant (HSP).

A method or proppant or slurry as herein described, wherein said polymer material is selected from the group consisting of plastic, polyethylene, high density PE, ultra high molecular weight PE, carbon microspheres, PANiCNQ, Mn-TCNE, or combinations thereof.

A method as herein described, wherein said detected paramagnetism is used to assess fracture width, depth, connectivity, and/or branching.

A method as herein described, further comprising e) imaging said fractures based on said detected paramagnetism.

A method as herein described, wherein said imaging step e) uses tomographic software or 3D mapping software.

A method as herein described, wherein the power and frequency of the AC field is varied and wherein a 3D map of said fractures is prepared based on said detected paramagnetism.

A method as herein described, wherein said detection step d) uses surface based detectors that continuous detect said paramagnetism over time and wherein a wherein a 3D map of said fractures is prepared based on said detected paramagnetism.

A method as herein described, wherein said applying step c) and detecting step d) uses a slingram instrument.

A method as herein described, wherein said applying step c uses 100-50,000 Hz, or 500-20,000 Hz or 1,000-10,000 Hz at greater than 0.1 Tesla, >1 Tesla or >2 Tesla, or >5 Tesla, or greater than 10 Tesla.

A method as herein described, where a core sample of said reservoir is obtained after step b, and wherein applying step c and detecting step d are performed on said core sample.

As used herein "proppant" is a solid particulate material, typically treated sand or man-made ceramic materials, designed to keep an induced hydraulic fracture open, during or following a fracturing treatment. It is added to a fracking fluid which may vary in composition depending on the type of fracturing used, but can be gel, foam or slickwater-based. Suitable solids include, but are not limited to, sand; bauxite; ceramic materials; glass materials; polymer materials; Teflon® materials; nut shell pieces; seed shell pieces; cured resinous particulates comprising nut shell pieces; fruit pit pieces; cured resinous particulates comprising fruit pit pieces; wood; composite particulates and combinations thereof.

The term "paramagnetic" as used herein refers to a substance that is generally nonmagnetic under normal circumstances. However, when placed under a magnetic field, in this case an AC magnetic field, the substance possesses magnetization in direct proportion to the strength of the field.

By "proppant slurry" what is meant is a fluid mixture having solid particulates with a liquid, e.g., proppant plus water or base fluid.

By "proppant pack" what is meant is a collection of proppant particulates within a fracture propping the fracture open so that fluids may flow therefrom. Proppant slurry additives and carrier fluid may partially remain in the proppant pack after placement.

By "base fluid" or "fracturing fluid" what is meant is that fluid mixed with proppant for injection into a reservoir to prop open fractures.

The size range of the proppant is very important. Typical proppant sizes are generally between 8 and 140 mesh (106 μm-2.36 mm), for example 16-30 mesh (600 μm-1180 μm), 20-40 mesh (420 μm-840 μm), 30-50 mesh (300 μm-600 μm), 40-70 mesh (212 μm-420 μm) or 70-140 mesh (106 μm-212 μm). When describing frac sand, the product is frequently referred to as simply the sieve cut, i.e. 20/40 sand.

The shape of the proppant is also important because shape and size influence the final permeability through the fracture. A wide range of particle sizes and shapes will lead to a tight packing arrangement, reducing permeability/conductivity. A controlled range of sizes and preferential spherical shape will lead to greater conductivity.

Since the induced paramagnetic proppants described herein are polymeric, they will typically have less crush strength than sand or ceramic proppants. Therefore, they are typically be mixed with other proppants having higher strength, e.g., high strength proppant or sand. In such case, the polymeric proppants can be sized and shaped so as to retained in the fractures, while the traditional proppants provide the needed strength.

The induced paramagnetic proppant can be mixed with any suitable fluid for use. See Table 1 for typical base fluids and their uses.

TABLE 1

FRACTURING FLUIDS AND CONDITIONS FOR THEIR USE

| Base Fluid | Fluid Type | Main Composition | Used For |
| --- | --- | --- | --- |
| Water | Linear | Guar, HPG, HEC, CMHPG | Short fractures, low temperature |
|  | Crosslinked | Crosslinked + Guar, HPG, CMHPG or CMHEC | Long fractures, high temperature |
|  | Micellar | Electrolite + Surfactant | Moderate length fractures, moderate temperature |
| Foam | Water based | Foamer + $N_2$ or $CO_2$ | Low-pressure formations |
|  | Acid based | Foamer + $N_2$ | Low pressure, carbonate formations |
|  | Alcohol based | Methanol + Foamer + $N_2$ | Low-pressure, water-sensitive formations |
| Oil | Linear | Gelling agent | Short fractures, water sensitive formations |
|  | Crosslinked | Gelling agent + Crosslinker | Long fractures, water-sensitive formations |
|  | Water emulsion | Water + Oil + Emulsifier | Moderate length fractures, good fluid loss control |
| Acid | Linear | Guar or HPG | Short fractures, carbonate formations |
|  | Crosslinked | Crosslinker + Guar or HPG | Longer, wider fractures, carbonate formations |
|  | Oil emulsion | Acid + Oil + Emulsifier | Moderate length fractures, carbonate formations |

Any suitable additive can be included in the proppant slurry or fracturing fluid, including such as anti-corrosive agents, anti-scaling agents, friction reducers, acids, salts, anti-bacterial agents, wetting agents, buffers, and the like. Typical additives are shown in Table 2. These can be added to the fluid mixed with proppant, added to the fracture slurry, added to the base fluid, or added at any other convenient point during mixing, injection or downhole, as appropriate.

TABLE 2

SUMMARY OF CHEMICAL ADDITIVES

| Type of Additive | Function Performed | Typical Products |
|---|---|---|
| Biocide | Kills bacteria | Glutaraldehyde carbonate |
| Breaker | Reduces fluid viscosity | Acid, oxidizer, enzyme breaker |
| Buffer | Controls the pH | Sodium bicarbonate, fumaric acid |
| Clay stabilizer | Prevents clay swelling | KCl, NHCl, KCl substitutes |
| Diverting agent | Diverts flow of fluid | Ball sealers, rock salt, flake boric acid |
| Fluid loss additive | Improves fluid efficiently | Diesel, particulates, fine sand |
| Friction reducer | Reduces the friction | Anionic copolymer |
| Iron Controller | Keeps iron in solution | Acetic and citric acid |
| Surfactant | Lowers surface tension | Fluorocarbon, Nonionic |
| Gel stabilizer | Reduces thermal degradation | MEOH, sodium thiosulphate |

Any suitable method of fracking can be used, including conventional fracking, dendritic fracking, HPP fracking, and the like.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention, such as instructions for use, buffers, and other additives, and the like.

The following abbreviations are used herein:

| ABBREVIATION | TERM |
|---|---|
| MRI | Magnetic resonance imaging |
| EPR | Electron Paramagnetic Resonance |
| bbl | Barrel of oil |
| Tscf | Trillion Standard Cubic Feet |

DETAILED DESCRIPTION

Figure 1:
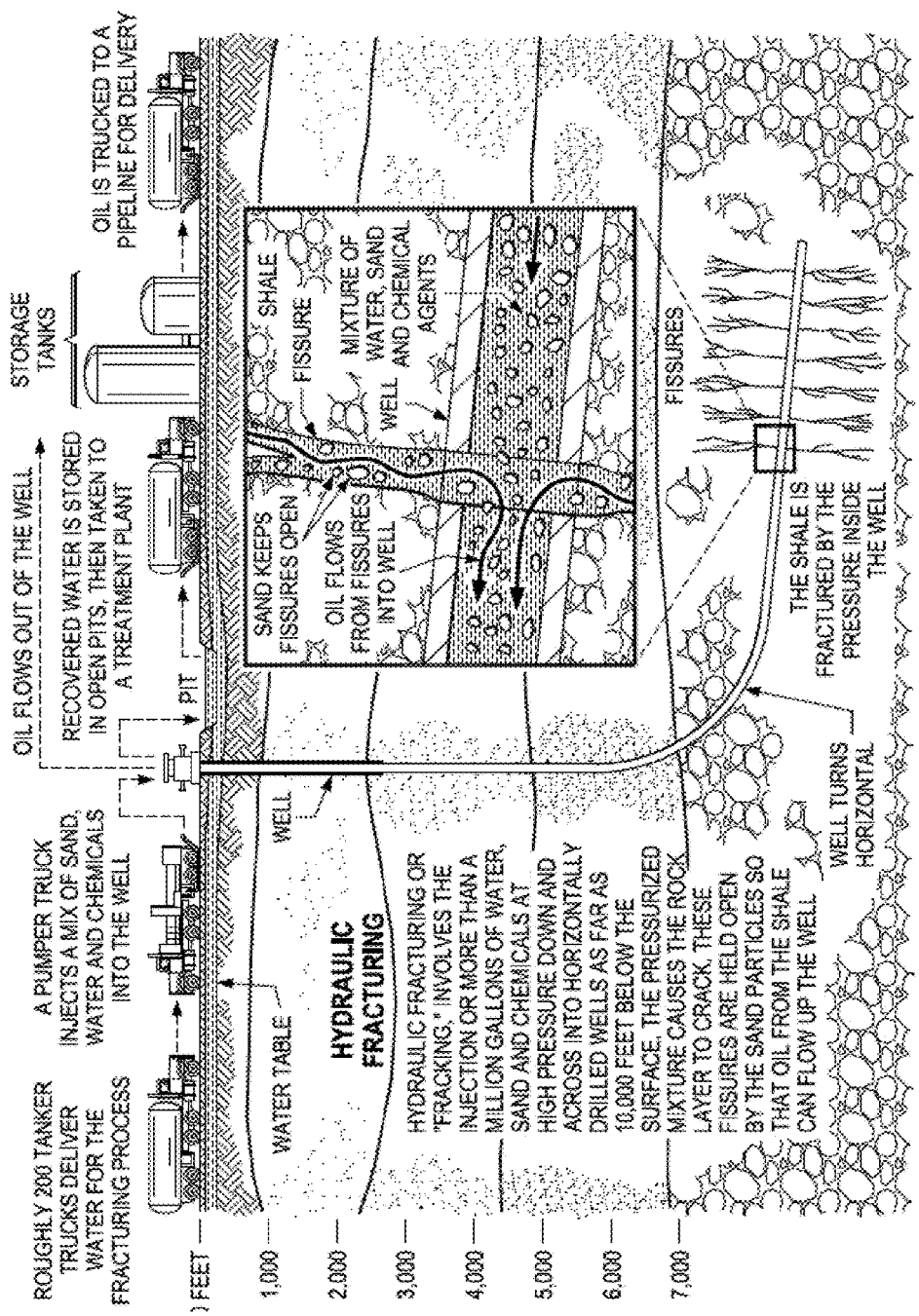
FIG. 1. Fracturing process.
Figure 2:
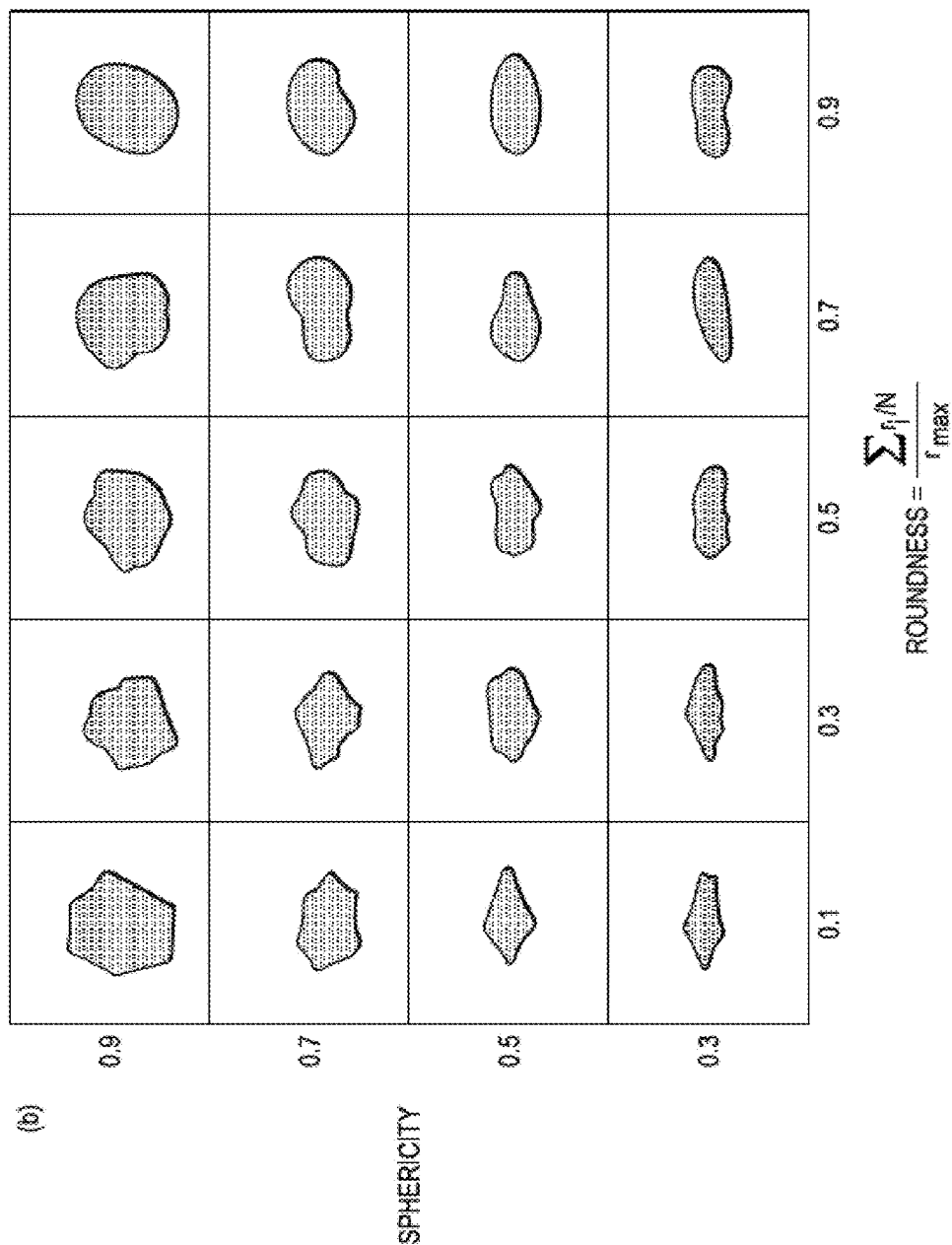
FIG. 2. Proppant roundness and sphericity.
Figure 3:
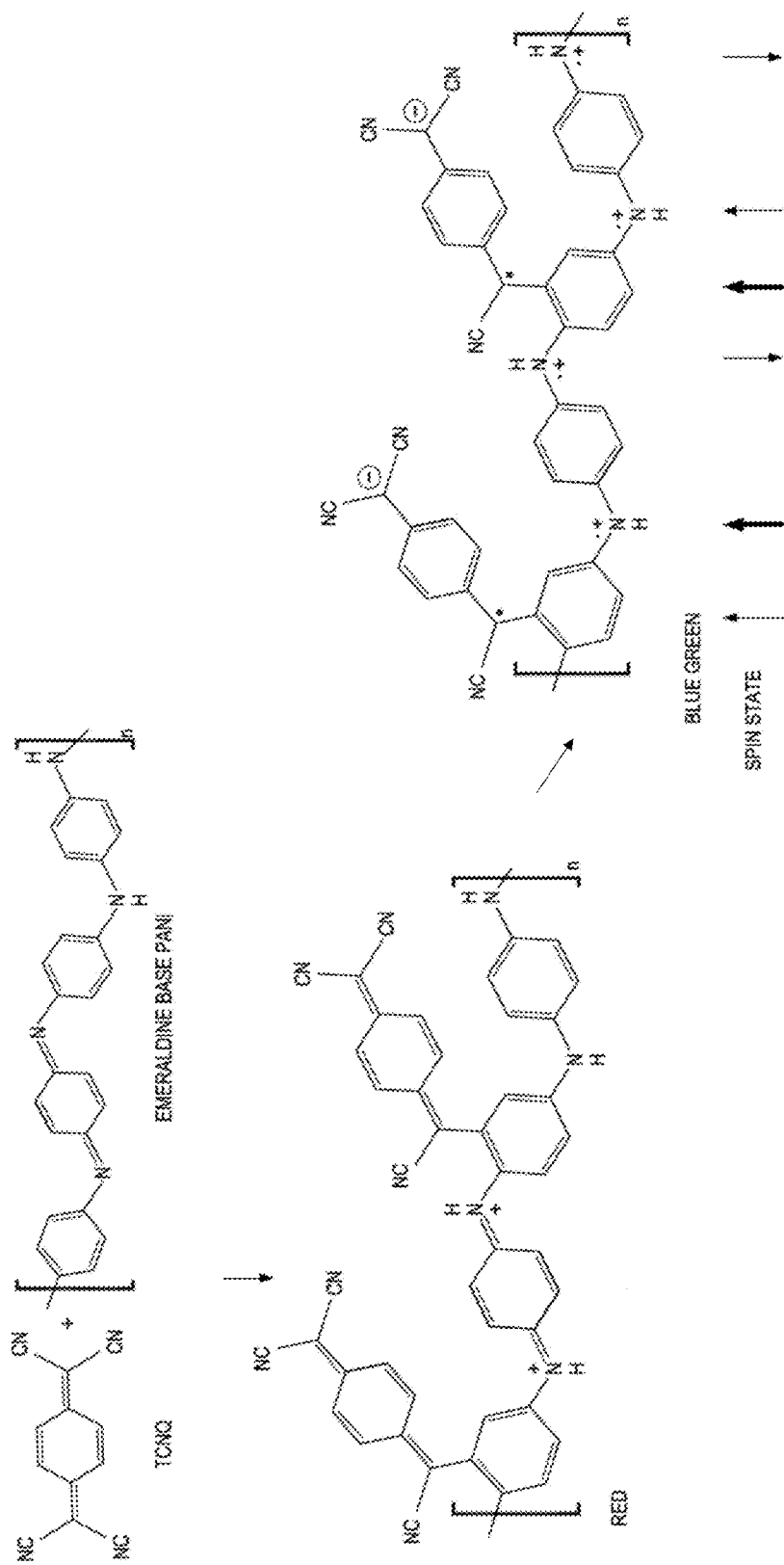
FIG. 3. Chemical structure of PANi and TCQN along with a plausible structure for the magnetically ordered polymer PaniCQN.

The present invention is exemplified with respect to polymeric proppants used in a bench top fracturing test using a simple base fluid. However, this technique is exemplary only, and the invention can be broadly applied to any fracturing method, fracking fluid and any reservoir. The following examples are intended to be illustrative only, and not unduly limit the scope of the appended claims.

Generally, speaking a method of assessing hydraulic fracturing in a reservoir is provided herein. Simply described, the method includes injecting a fracturing fluid into a reservoir at a pressure sufficient to fracture said reservoir producing fractures, followed by injecting a proppant into said fracture (typically as a proppant slurry with frack fluid or other base fluid). The proppant is a diamagnetic polymeric material that becomes paramagnetic when exposed to an alternating current (AC) field of the appropriate frequency. Any suitable fluids and fracturing methodologies can be used for these steps.

Once the polymeric proppants have reached the fractures, an AC field is applied thereto to induce paramagnetism in said proppants; and that paramagnetism is then detected using suitable equipment. The detected paramagnetism can be used to assess e.g., fracture width, depth, connectivity, and/or branching. It can also be used for imaging.

These steps can be applied repeatedly, e.g., progressing deeper and deeper into the reservoir with each injection of proppant. Alternatively, the methods can be more or less continuous, e.g., with surface detection equipment. Further, with continuous monitoring the surveys can be done over time, thus providing 4D information.

In preferred embodiments the paramagnetic information can be used to generate, 2D, 3D or 4D images, using industry standard mapping software e.g., Landmark or GM-SYS or even Surfer by Golden Software.

In other embodiments, the power and frequency of the AC field is varied and a 3D map of said fractures is prepared based on said detected paramagnetism based upon variations in the measured field due to variations in the blocking in frequency of the injected proppants In some embodiments, the detection is in situ using e.g., logging tools or IP type instruments using an add on AC coil field generator controlled from the surface. In other embodiments, a core sample of the fractured reservoir is obtained after the core sample analyzed as described herein using commercially available multi-frequency susceptibility instruments listed above.

Other embodiments of the disclosure are directed to novel proppants comprising a polymeric particle comprising a diamagnetic polymer that exhibits induced paramagnetism when exposed to an AC field. These proppants can be provided alone or mixed with a sand proppant, a ceramic proppant or a high strength proppant (HSP).

In yet other embodiments, proppant slurries are provided, wherein the proppants or proppant mixtures are combined with a fracturing or other base fluid.

The following references are incorporated by reference in their entirety for all purposes.

U.S. Pat. No. 8,269,501 Methods for Magnetic Imaging of Geological Structures

U.S. Pat. No. 8,230,918 Method of characterizing hydrocarbon reservoir fractures in situ with artificially enhanced magnetic anisotropy Eick, P. M., Correlation of Ash-Flow Tuffs by Multifrequency Susceptiblity Measurements.", Masters Thesis, University of Utah, December 1989.

Pol V G, Upcycling: converting waste plastics into paramagnetic, conducting, solid, pure carbon microspheres, Environ Sci Technol. 2010 Jun. 15; 44(12):4753-9.

Zaidia, N. A., Room temperature magnetic order in an organic magnet derived from polyaniline, Polymer 45 (2004) 5683-5689.

What is claimed is:

1. A method of assessing hydraulic fracturing in a reservoir, said method comprising:
   a) injecting a fracturing fluid into a reservoir at a pressure sufficient to fracture said reservoir producing fractures;
   b) injecting a proppant into said fractures, said proppant comprising a polymeric material that becomes paramagnetic when exposed to an alternating current (AC) field;
   c) applying an AC magnetic field to said fractures to induce paramagnetism in said proppants, wherein the power and frequency of the AC field is varied;
   d) detecting said induced paramagnetism to assess said fractures; and
   e) generating a 3D map of said fractures is prepared based on said detected paramagnetism;
   wherein a core sample of said reservoir is obtained after step b, and wherein applying step c and detecting step d are performed on said core sample.

2. The method of claim 1, wherein said polymer material is selected from one or more of polyethylene (PE), PAN-iCNQ, and Mn-TCNE.

3. The method of claim 1, wherein said polymer material is one of high density PE or ultra high molecular weight PE.

4. The method of claim 1, wherein said detected paramagnetism is used to assess one or more of fracture width, depth, connectivity, and branching.

5. The method of claim 1, further comprising e) imaging said fractures based on said detected paramagnetism.

6. The method of claim 5, wherein said imaging step e) uses one or more of tomographic software and 3D mapping software.

7. The method of claim 1, wherein said detection step d) uses surface based detectors that continuous detect said paramagnetism over time and wherein a wherein a 3D map of said fractures is prepared based on said detected paramagnetism.

8. The method of claim 1, wherein said applying step c) and detecting step d) uses a slingram instrument.

9. The method of claim 1, wherein said applying step c uses 500 to 20,000 Hz.

* * * * *